United States Patent
Dutta et al.

(10) Patent No.: US 12,405,728 B2
(45) Date of Patent: *Sep. 2, 2025

(54) WORKLOAD MANAGEMENT USING A TRAINED MODEL

(71) Applicant: Hewlett Packard Enterprise Development LP, Spring, TX (US)

(72) Inventors: Mayukh Dutta, Karnataka (IN); Aesha Dhar Roy, Karnataka (IN); Manoj Srivatsav, Karnataka (IN); Ganesha Devadiga, Karnataka (IN); Geethanjali N. Rao, Karnataka (IN); Prasenjit Saha, Karnataka (IN); Jharna Aggarwal, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,326

(22) Filed: May 29, 2024

(65) Prior Publication Data

US 2024/0319885 A1 Sep. 26, 2024

Related U.S. Application Data

(63) Continuation of application No. 17/303,883, filed on Jun. 9, 2021, now Pat. No. 12,093,530.

(51) Int. Cl.
*G06F 3/06* (2006.01)
*G06N 20/00* (2019.01)

(52) U.S. Cl.
CPC .......... *G06F 3/0613* (2013.01); *G06F 3/0659* (2013.01); *G06F 3/067* (2013.01); *G06N 20/00* (2019.01)

(58) Field of Classification Search
None
See application file for complete search history.

(56) References Cited

U.S. PATENT DOCUMENTS

| 10,509,685 B2 | 12/2019 | Gong et al. |
| 2016/0164962 A1 | 6/2016 | Ghosh et al. |

(Continued)

FOREIGN PATENT DOCUMENTS

| CN | 112005219 A | 11/2020 |
| CN | 112099939 A | 12/2020 |
| IN | 201941024014 | 12/2020 |

OTHER PUBLICATIONS

Bouattour, H. et al.; "Root Cause Analysis of Noisy Neighbors in a Virtualized Infrastructure"; May 13, 2020; 7 pages.

(Continued)

*Primary Examiner* — Baboucarr Faal
(74) *Attorney, Agent, or Firm* — Trop, Pruner & Hu, P.C.

(57) ABSTRACT

In some examples, a system creates a training data set based on features of sample workloads, the training data set comprising labels associated with the features of the sample workloads, where the labels are based on load indicators generated in a computing environment relating to load conditions of the computing environment resulting from execution of the sample workloads. The system groups selected workloads into a plurality of workload clusters based on features of the selected workloads, and computes, using a model trained based on the training data set, parameters representing contributions of respective workload clusters of the plurality of workload clusters to a load in the computing environment. The system performs workload management in the computing environment based on the computed parameters.

20 Claims, 4 Drawing Sheets

(56) References Cited

U.S. PATENT DOCUMENTS

| | | |
|---|---|---|
| 2016/0284021 A1 | 9/2016 | Herdrich et al. |
| 2019/0310893 A1 | 10/2019 | Aronovich |
| 2019/0334786 A1 | 10/2019 | Dutta et al. |
| 2020/0210387 A1 | 7/2020 | Brown et al. |
| 2022/0334944 A1 | 10/2022 | Martynov et al. |

OTHER PUBLICATIONS

Dillaman et al.; "Ceph Block Performance Monitoring: Putting noisy neighbors in their place with RBD top and QoS"; Apr. 15, 2020; 10 pages; <https://www.redhat.com/en/blog/ceph-block-performance-monitoring-putting-noisy-neighbors-their-place-rbd-top-and-qos>.

Dimitris Krekoukias; "The Well-Behaved Storage System: Automatic Noisy Neighbor Avoidance"; Apr. 8, 2016; 7 pages; <http://recoverymonkey.org/2016/04/08/the-well-behaved-storage-system-automatic-noisy-neighbor-avoidance/>.

Gurunath Karaje, "Designing Storage Quality Of Service For App Centric Infrastructure," Jan. 19, 2017; 6 pages.

Margolin, U., et al.; "Using Machine Learning to Detect Noisy Neighbors in 5G Networks"; 2016; 4 pages; <https://arxiv.org/pdf/1610.07419.pdf>.

Ordozgoiti, B. et al.; "Deep convolutional neural networks for detecting noisy neighbours in cloud infrastructure"; Apr. 26-28, 2017; 6 pages.

Rfenton4, "NimbleOS 4: Quality of Service (QoS-Limits)," Apr. 26, 2017; 9 pages; https://community.hpe.com/t5/Around-the-Storage-Block/NimbleOS-4-Quality-of-Service-QoS-Limits/ba-p/6986455#.YA9GJuhKiPp>.

Wikipedia, Elbow method (clustering) last edited on Dec. 11, 2020 (2 pages).

Wikipedia, k-means clustering last edited on May 6, 2021 (17 pages).

WORKLOAD MANAGEMENT USING A TRAINED MODEL

CROSS-REFERENCE TO RELATED APPLICATIONS

This application is a continuation application of and claims priority to application Ser. No. 17/303,883, filed on Jun. 9, 2021, the contents of which are hereby incorporated by reference in their entireties.

BACKGROUND

A storage system includes storage resources and other resources (including processing resources and communication resources) on which various different types of workloads can be performed. Storage resources can refer to physical storage resources or logical storage resources that can be used to store data. The different workloads can compete for the resources of the storage system, leading to resource contention that can adversely affect the performance of some workloads.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Multiple workloads running in a storage system can overload shared resources of the storage system. The shared resources can include physical storage resources such as storage devices, including disk-based storage devices, solid state storage devices, memory devices (e.g., dynamic random access memory (DRAM) devices, static random access memory (SRAM) devices, etc.), and so forth. The shared resources also include processing resources (e.g., processors, cores of processors, etc.), communication resources (e.g., network interface controllers, switches, etc.), and so forth.

Shared resources can also include logical resources, such as virtual machines, virtual processors, virtual communication devices, and so forth.

A "workload" can refer to any collection of activities that are performed by an entity (e.g., machine-readable instructions) in the storage system. More generally, a "workload" can refer to any collection of activities that are performed by an entity (e.g., machine-readable instructions) in a computing environment, such as the computing environment of a storage system, a computer system, a communication system, a cloud system, a data center, a server system, and so forth.

A first workload can adversely affect the performance of a second workload in the storage system in scenarios where resource usage by the first workload prevents the second workload from executing or causes the second workload to execute more slowly. Workloads that adversely affect the performance of other workloads can be referred to as noisy neighbors.

Different types of workloads in a storage system can be characterized by a variety of input/output (I/O) types and access patterns with respect to a storage volume (or multiple storage volumes). I/O types can refer to read accesses to read data from storage volume(s), write accesses to write data to storage volume(s), I/O accesses of different priorities, different categories of I/O accesses (e.g., I/O accesses associated with reads and writes requested by host systems, I/O accesses associated with synchronization operations, I/O accesses associated with backup operations, etc.), and so forth. Different access patterns can be based on any or some combination of the following: frequency of accessing storage volume(s), a quantity of data accessed in a given access operation, burstiness of I/O accesses, and so forth.

A "storage volume" can refer to a logical container or other construct into which data can be added, such as by write operations. Data can also be retrieved from a storage volume.

When an overload condition is detected in a storage system, a human administrator of the storage system may be notified. The administrator may attempt to troubleshoot the cause of resource contentions in the storage system, based on a manual analysis of information collected for workloads that have executed in the storage system. Such manual analysis can be time-consuming and can produce inaccurate results.

In other examples, storage systems can be built with quality-of-service (QOS) mechanisms that attempt to ensure that workloads are provided with predictable service levels. In some examples, QoS mechanisms can apply workload constraints to restrict resource usage of any given workload to prevent the given workload from monopolizing resources of the storage system.

However, knowing the precise workload constraints to be placed so that resources of the storage system are appropriately distributed between contending workloads can be challenging. For example, the administrator may have to study historical profiles of workloads that share resources of the storage system to determine where and when resource contentions occur, and to determine which workloads are over-utilizing the shared resources. Such manual analysis can be difficult to perform and can result in incorrect constraints being applied on workloads, which may end up reducing the performance of some workloads.

In accordance with some implementations of the present disclosure, workloads in a computing environment (such as a storage system) can be grouped into multiple workload clusters based on features of the workloads. A model (trained using a training data set) can be used to compute parameters that represent contributions of respective workload clusters to a load in the computing environment. Workload management in the computing environment can be performed based on the computed parameters.

In the ensuing discussion, reference is made to workload management for storage systems. It is noted that techniques or mechanisms according to some examples can be applied to workload management in other types of computing environments.

Figure 1:
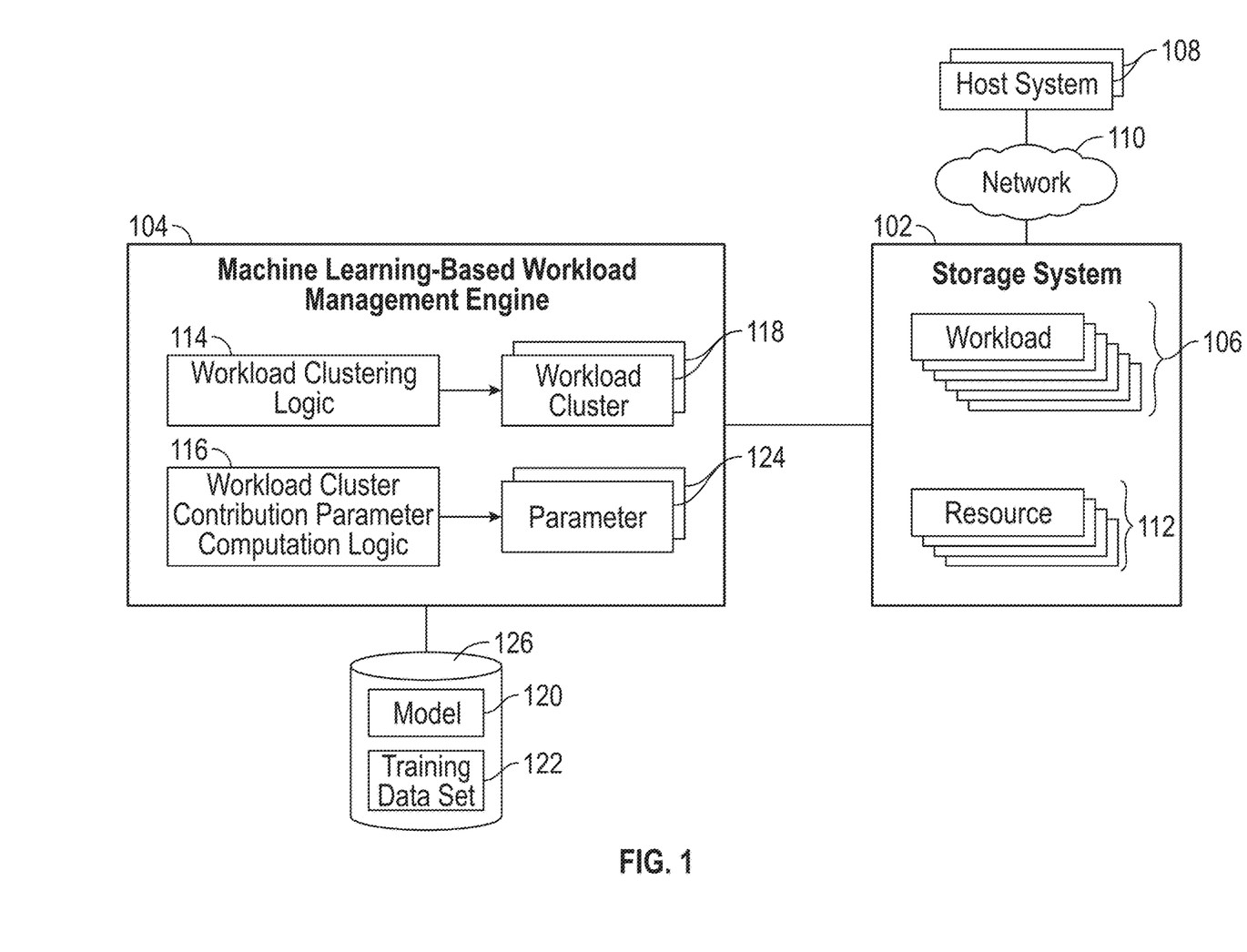
FIG. 1 is a block diagram of an arrangement that includes a storage system and a workload management engine, according to some examples.

FIG. 1 is a block diagram of an example arrangement that includes a storage system 102 and a machine learning-based workload management engine 104 that applies machine learning in performing workload management of workloads 106 executing in the storage system 102. Although FIG. 1 shows the workload management engine 104 being separate from the storage system 102, in other examples, the workload management engine 104 can be part of the storage system 102.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The workloads 106 may be performed by programs (or more generally, machine-readable instructions) or other entities in the storage system 102. The workloads 106 may be performed in response to requests from host systems 108 received over a network 110. A "host system" can refer to any device (e.g., a server computer, a user computer, a smartphone, a vehicle, etc.) that is capable of requesting access of data (reading or writing data) in the storage system 102 or performing other operations with respect to the storage system 102. The network 110 can include a storage area network (SAN), a local area network (LAN), and so forth.

The storage system 102 includes resources 112, some of which can be shared by the workloads 106 when executing. The resources 112 can include physical resources and/or logical resources of the storage system 102.

The workload management engine 104 includes a workload clustering logic 114 and a workload cluster contribution parameter computation logic 116. As used here, a "logic" that is part of the workload management engine 104 can refer to a portion of the hardware processing circuit of the workload management engine 104 or to machine-readable instructions executable by the workload management engine 104.

Workload management that can be performed by the workload management engine 104 can include controlling usage of the resources 112 by the workloads 106. For example, the workload management engine 104 can dynamically place constraints on the usage of the resources 112 by specific workloads 106. As an example, if the workload management engine 104 identifies (based on tasks performed by the workload clustering logic 114 and the workload cluster contribution parameter computation logic 116, as discussed further below) that a given workload 106 is adversely affecting other workloads 106, the workload management engine 104 can place a constraint on usage of resources 112 by the given workload 106. For example, the workload management engine can place a bandwidth restriction on the access of a resource 112 (or multiple resources 112). For example, a bandwidth restriction can be set on a storage volume that restricts a rate of access of the storage volume by the given workload to less than some specified I/O throughput. For example, the bandwidth restriction may be part of a QoS rule in which a workload can be restricted to X% of a maximum I/O throughput used by the workload in a given time period (e.g., 4 hours or another time period). X% can be 75% or another percentage, and can be dynamically adjusted.

In some examples, whether or not a workload is subject to a constraint on resource usage can also be based on a priority of the workload as well as other factors (e.g., whether the workload is a short duration or long duration workload). If a workload is a high priority workload that is expected to run for a relatively short period of time, then the workload may not be subjected to a constraint on resource usage even if the workload is consuming a relatively large amount of resources. However, if a workload has a low priority and/or is expected to run for a relatively long period of time, then the workload may be subjected to a constraint on resource usage if the workload is consuming a relatively large amount of resources.

The workload clustering logic 114 groups the workloads 106 into multiple workload clusters 118 based on features of the workloads 106. Each workload cluster 118 represents workloads that are similar to one another according to a similarity criterion (e.g., features have values that are similar to one another to within a specified range or threshold). For example, workloads in a workload cluster includes workloads that share similar I/O patterns, which can be based on I/O types and access patterns (as discussed further above).

A feature of a workload can refer to an attribute that represents a characteristic of the workload. In an example, a feature can represent a write throughput when accessing a storage volume. Write throughput can refer to a rate of write access of a number of storage volumes, where "number' can refer to 0, 1 or more than 1. In other examples, other features can be employed, such as a read throughput relating to read access of a number of storage volumes, a total throughput for both write and read accesses of a number of storage volumes, or any other attribute that represents a characteristic relating to I/O accesses of data in a number of storage volumes.

In some examples, features of a workload can include write throughput measurements of write throughput by a workload of a given storage volume in corresponding intervals in an overall (larger) time period. For example, write throughput measurements for the given storage volume can be made in each 5-minute interval over for 4 hours. A write throughput measurement can be collected by a monitoring agent (implemented in hardware or as machine-readable instructions) in the storage system 102. In the above example, there are 48 write throughput measurements in the 48 5-minute intervals over the 4 hours. The 48 write throughput measurements for each workload make up 48 features that are used for clustering. In other examples, different time intervals in which write throughput measurements are made can be employed. Also, the overall time period over which the write throughput measurements are made can also be changed.

In further examples, features in addition to or in place of write throughput measurements of workloads can be used in clustering the workloads 106.

The clustering of the workloads 106 into the workload clusters 118 by the workload clustering logic 114 can reduce the quantity of workloads that are considered when determining which workload(s) is (are) responsible for a load of the storage system 102 and thus may be responsible for adversely affecting the performance of other workloads. For example, there may be hundreds or thousands of workloads 106 that are performing I/O accesses of respective storage volumes. By clustering the workloads 106, a smaller quantity of workload clusters 118 are considered by the workload management engine 104.

The quantity of workload clusters 118 to be produced by the workload clustering logic 114 can be selected using an optimization technique such as an elbow method. In other examples, a user (e.g., an expert, an administrator, etc.) can select the quantity of workload clusters 118 to be used.

In some examples, the clustering of the workloads 106 applied by the workload clustering logic 114 is k-means clustering, which partitions the workloads 106 into k clusters (k≥2). In other examples, other clustering techniques can be used, such as mean-shift clustering, density-based spatial clustering, and so forth.

Once the workload clusters 118 are produced by the workload clustering logic 114, the workload management engine 104 can determine which workload cluster 118 is responsible for a load of the storage system 102.

The workload cluster contribution parameter computation logic 116 computes, using a model 120 trained based on a training data set 122, parameters 124 that represent contributions of respective workload clusters 118 to a load in the storage system 102. Based on the computed parameters 124, the workload management engine 104 performs workload management in the storage system 102.

In some examples, the model 120 and the training data set 122 can be stored in a repository 126. The repository 126 can be contained in a storage device or multiple storage devices. In examples where the workload management engine 104 is part of the storage system 102, the repository 126 can be implemented using storage device(s) of the storage system 102.

The model 120 can be trained during normal operations of the storage system 102. "Normal operations" refer to operations of the storage system 102 in response to requests received by the storage system 102, such as from the host systems 108. The training data set 122 can be continually updated as measurements (e.g., the write throughput measurements discussed above) are provided. The training data set 122 can include features for a sample of workloads. As more workloads are executed in the storage system 102, features for such additional workloads are provided for inclusion in the training data set 122, either to add to the training data set 122 or to replace (partially) previous features.

In response to an update of the training data set 122, the model 120 can be updated (re-trained) based on the updated training data set 122. Updating (re-training) the model 120 can refer to updating parameters of the model 120 using the updated training data set 122. As a result, the model 120 is able to adjust to changing workload characteristics over time.

The foregoing is part of a machine learning process in which the model 120 is continually re-trained based on historical workload pattern data available from the storage system 102, and the re-trained model 120 is able to predict which workload is contributing to the load on the storage system 102.

In some examples, the training data set 122 includes data points that are defined by N variables (N=quantity of clusters). More generally, the training data set 122 includes load indicators (e.g., values of L_t), clusters of workloads, and measures relating to resource access (e.g., write throughput measurements).

The value of each variable is the collective write throughput of the workloads that belong to a respective workload cluster 118. For each workload, there are 48 features (write throughput measurements in the 48 time intervals, in the example where write throughput measurements are made in 5-minute intervals over a 4-hour period).

In some examples, the model 120 can be expressed using the following function:

$$L\_t = \\ wc\_1 * wc\_1\_kbps + wc\_2 * wc\_2\_kbps + wc\_3 * wc\_3\_kbps + \ldots \quad \text{(Eq. 1)}$$

L_t represents a load on the storage system 102 at time t. L_t can be set to a first value (e.g., 0) to indicate that the load on the storage system 102 is low. L_t can be set to a second value (e.g., a value greater than 0) to indicate that the load on the storage system 102 is high.

In some examples, the load on the storage system 102 during an observed time interval is assumed to be high (and indicated by setting L_t=1 or greater than 1) when there are any delayed acknowledgments reported during the observed time interval. The load on the storage system 102 during the observed time interval is assumed to be low (and indicated by setting L_t=0) when there are no delayed acknowledgments reported during the observed time interval.

A delayed acknowledgment is generated by a backend subsystem of the storage system 102 when the backend subsystem is unable to keep up with incoming workloads (e.g., a burst of writes). The delayed acknowledgment represents a delay in a completion of an access of a resource in the storage system 102. The backend subsystem can include any or some combination of the following: storage devices, cache memories, adapters that communicate with storage devices, and so forth.

The delayed acknowledgement is in the form of an indicator (e.g., a signal, a message, an information element, etc.) that is sent by the backend subsystem, such as to the host systems 108 or other requesters that have submitted requests to the storage system 102. The inability to keep up with incoming workloads by the backend subsystem can be due to an overload condition of processing resources, storage resources, communication resources, and so forth.

The workload management engine 104 is able to detect the presence of the delayed acknowledgments and thus can set the value of L_t accordingly. For example, L_t can be set to 0 to indicate that the load on the storage system 102 is low, and L_t can be set to a value greater than 0 (e.g., 1) to indicate that the load on the storage system 102 is high.

In other examples, the load on the storage system 102 during an observed time interval is assumed to be low if usage of the resources 112 is less than a specified threshold, and the load on the storage system 102 during an observed time interval is assumed to be high if usage of the resources 112 exceeds the specified threshold.

In Eq. 1, wc_i, i=1, 2, . . . , is a coefficient corresponding to workload cluster i at time t, and the parameter wc_i_kbps represents a measured throughput of workload cluster i at time t (expressed as kilobits per second (kbps) in the example). Since workload cluster i includes multiple workloads, the value of wc_i_kbps can be the average (or some other mathematical aggregate such as mean, maximum, sum, etc.) of the measured throughputs of the workloads in workload cluster i.

Eq. 1 is an example of a linear regression model, which is updated using machine learning (by updating the training data set 122 and re-training the model in response to triggers). The linear regression model models how certain parameters (e.g., wc_1, wc_2, etc.) and features (e.g., wc_1_kbps, wc_2_kbps, etc.) affect an outcome. According to Eq. 1, the outcome is the load (represented as L_t in Eq. 1) on the storage system 102.

In response to L_t having the second value (e.g., >0) indicating that load on the storage system 102 is high, the model 120 (as trained based on features derived from the most recent workloads 106 of the storage system 102) expressed by Eq. 1 can be used by the workload cluster contribution parameter computation logic 116 to compute the values of parameters wc_1, wc_2, and so forth. Parameters wc_1, wc_2, and so forth are examples of the parameters 124. Measured throughputs in each time interval t are supplied as inputs to the model 120, which outputs parameters wc_1, wc_2, and so forth.

The values of parameters wc_1, wc_2, and so forth, reflect the contribution of respective workload clusters 118 to the load on the storage system 102. In some examples, statistical measures are used for determining whether or not a respective workload cluster i is a significant workload cluster including "bully" workloads that may adversely affect the performance of "victim" workloads. The bully workloads may be those workloads that are monopolizing or using an unfair share of the resources 112 of the storage system 102. The "victim" workloads may be those workloads whose performance are adversely affected by other workload(s).

An example statistical measure that can be used is a statistical p-value of a linear regression model (e.g., according to Eq. 1). The p-value is obtained based on the regression model for each feature (wc_i_kbps) of the regression model. The coefficients (wc_i) of the regression model describe a mathematical relationship between each independent variable (e.g., L_t) and a dependent variable (e.g., wc_i_kbps). The p-values for the coefficients indicate whether these relationships are statistically significant. Using 95% significance as an example, a p-value of less than 0.05 is not statistically significant. If the p-values of all features are greater than 0.05 based on the regression model, then workload clusters that are identified as significant workload clusters (i.e., containing bully workloads) are those associated with positive coefficient (wc_i) values.

In some examples, in addition to p-values, a coefficient of determination, $R^2$, is also used to determine whether a workload cluster is a significant workload cluster. The coefficient of determination, $R^2$, is a statistical measure of how close data is fitted to regression line corresponding to the regression model. $R^2$ ranges in value between 0 and 1. For example, irrespective of p-values and coefficient values, if $R^2$ for the regression model is less than a threshold (e.g., 70% or another threshold), then this may indicate that none of the workload clusters are significant workload clusters, and thus no workload cluster is identified as significant (i.e., there are no bully workloads identified). On the other hand, if $R^2$ exceeds the threshold, then p-values and coefficient values as noted above are used to identify significant workload clusters.

In other examples, the workload management engine 104 can sort the workload clusters 118 according to values of parameters wc_1, wc_2, and so forth. Assuming that a higher value of wc_i indicates that the respective workload cluster i has a larger contribution to the load on the storage system 102 as compared to a workload cluster j associated with a lower value of wc_j, the workload clusters 118 can be ordered according to descending order of values of parameters wc_1, wc_2, and so forth. If the ordering of the workload clusters 118 produces a ranked list of workload clusters, then a given workload cluster (or multiple given workload clusters) at the front of the ranked list may be the workload cluster that has the greatest contribution to the load on the storage system 102. Workloads in the given workload cluster(s) may be identified by the workload management engine 104 as the workloads responsible for overloading the storage system 102.

Using the workload management engine 104 according to some examples, performance of the storage system 102 may be improved by dealing with noisy neighbor scenarios, in which bully workloads may adversely affect the performance of "victim" workloads. Constraints can then be placed on the "bully" workloads to reduce the amount of resource usage by the bully workloads so that other workloads can use the shared resources. As noted further above, whether or not constraints are placed on bully workloads may further consider the priority of the workloads, the expected duration of execution, and/or other factors.

The training data set 122 can be a labelled training data set, in which labels are assigned to collections of workload-related data in the training data set 122. The workload-related data includes the features and parameters (e.g., 124) for sample workloads (e.g., where the sample workloads are represented by workload clusters in the past 4 hours). The labels assigned can be based on whether or not delayed acknowledgments were issued in respective time intervals (e.g., the 5-minute intervals). For example, the labels can be in the form of L_t in Eq. 1, where L_t is set to 0 if no delayed acknowledgment issued in time interval t, and L_t is set to 1 if a delayed acknowledgement was issued in time interval t. Thus, in the training data set 122, a collection of feature(s) (e.g., wc_i_kbps for each cluster i in time interval t) and parameter(s) (e.g., wc_i for each cluster i in time interval t) is associated with a respective label (e.g., L_t).

Note that the labels (e.g., L_t) are based on indicators of load (e.g., delayed acknowledgments) that are produced during a normal operation of the storage system 102. Thus, the labels of the training data set 122 are automatically generated during the normal operation of the storage system 102, and a human would not have to manually assign labels to training data of a training data set 122.

Figure 2:
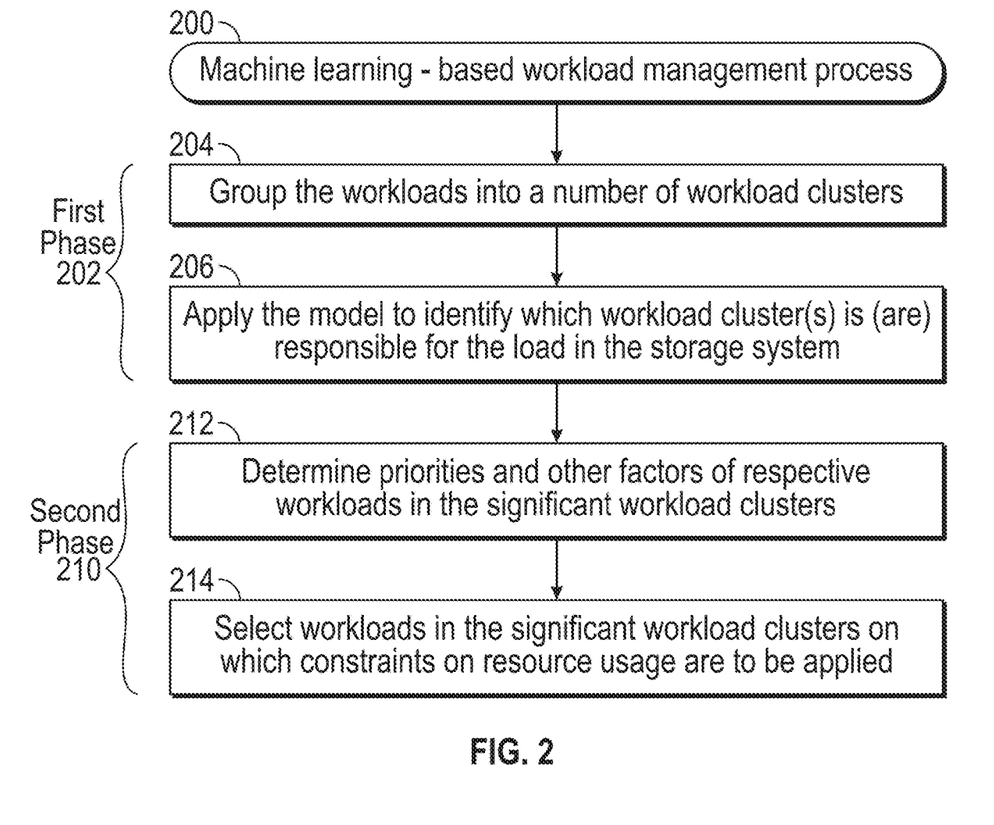
FIG. 2 is a flow diagram of a machine learning-based workload management process according to some examples.

To optimize the storage system 102 for predictable performance by dealing with noisy neighbor scenarios, the machine learning-based workload management engine 104 automatically identifies bullies and victims in a heterogeneous workload environment. As shown in FIG. 2, the machine learning-based workload management engine 104 can perform a machine learning-based workload management process 200 that includes two phases. In a first phase 202, the machine learning-based workload management engine 104 detects workloads that are monopolizing the resources 112 of the storage system. In a second phase 210, the machine learning-based workload management engine 104 places constraints on such workloads to help restore the performance of higher priority workloads.

In the first phase 202, the machine learning-based workload management engine 104 applies a self-training machine learning model (e.g., 120) that trains itself on the training data set 122, which is based on historical workload pattern data available for the storage system 102 (e.g., 4 hours or another overall time period of historical data) to predict which workload(s) is (are) contributing to the load on the storage system 102. The load during an observed time interval (e.g., a 5-minute interval or another time interval) is assumed to be high (e.g., L_t set to 1) when there is a delayed acknowledgment reported during the observed time interval, and the load at the observed interval is assumed to be low (e.g., L_t set to 0) when there is no delayed acknowledgment reported during the observed time interval.

To determine which workload(s) (among several workloads running in the storage system 102) is (are) responsible for the load in the storage system 102, the machine learning-based workload management engine 104 first groups (at 204) the workloads into a number of workload clusters, where the number can be decided using an optimization technique such as an elbow method. For clustering, the machine learning-based workload management engine 104 defines features of data points that would be clustered, where a "data point" can include write throughput measurements at 5-minute intervals in an overall time period of 4 hours.

Note that the model 120 is trained on the storage system 102 in the field (e.g., as used during operation at a customer site), and the model 120 is able to re-train itself on the most recent I/O patterns (in workloads) observed in the storage system 102. Data of the most recent I/O patterns is used to update the training data set 122. For example, the machine learning-based workload management engine 104 can sample 4 hours of workload data from the storage system 102, going back 4 hours from the current time instant. As a result, there are 48 write throughput measurements for a storage volume (one for each 5-minute interval over 4 hours). This provides us a data point with 48 features. A similar data point can be obtained for each storage volume.

The workload clustering logic 114 applies k-means clustering on the data points to produce the workload clusters 118. Each workload cluster 118 represents workloads with similar I/O patterns on a storage volume as measured over the last 4 hours. This helps to reduce the number of workloads to track to a manageable number (down to the number of workload clusters from several hundreds of workloads).

The model 120 (e.g., a linear regression model) is applied (at 206) to identify which workload cluster(s) is (are) responsible for the load in the storage system 102 at respective time intervals. The model 120 represents how certain parameters and features affect an outcome (response), where the outcome is the load on the storage system 102, a feature is a collective throughput of the workloads in a workload cluster as measured for each 5-minute interval of time over the past 4 hours, and a parameter (e.g., the coefficient wc_i of Eq. 1) represents a contribution of the workload clusters to a load in the storage system 102.

The training data set 122 for the model 120 includes data points that are defined by variables for the quantity of workload clusters). The value of each variable is the collective write throughput of the workloads that belong to a respective workload cluster 118. The are 48 variables (for the 48 5-minute time intervals over four hours) for each workload cluster.

Since there are a relatively small quantity of training samples (including the 48 variables), the number of features is reduced by clustering the workloads to avoid what is referred to as the "curse of dimensionality" in machine learning. The coefficients wc_i, i=1, 2, . . . , of Eq. 1 assigned to the workload clusters by the trained model 120 are representative of the contribution of the respective workload clusters to the load in the storage system 102.

Every time the model 120 is re-trained as more I/O pattern data for workloads are executed in the storage system 102, the coefficients derived from the model 120 reflect the contribution of the workload clusters to the load in the storage system 102 as learned from the most recent information captured (e.g., past 4 hours). Therefore, the model 120 is able to adjust to the changing workload profiles from time to time. In some examples, as explained further above, statistical measures are used for determining whether or not a respective workload cluster i is a significant workload cluster including bully workloads that may adversely affect the performance of victim workloads.

The second phase performed by the machine learning-based workload management engine includes applying a constraint on resource usage by a workload in a significant workload cluster based on a priority of the workload.

In some examples, whether or not a workload is subject to a constraint on resource usage can also be based on a priority of the workload as well as other factors (e.g., whether the workload is a short duration or long duration workload). If a workload is a high priority workload that is expected to run for a relatively short period of time, then the workload may not be subjected to a constraint on resource usage even if the workload is consuming a relatively large amount of resources. However, if a workload has a low priority and/or is expected to run for a relatively long period of time, then the workload may be subjected to a constraint on resource usage if the workload is consuming a relatively large amount of resources.

For example, a constraint on resource usage can include a bandwidth restriction, which may be part of a QoS rule specifying that a workload can be restricted to X% of a maximum I/O throughput used by the workload in a given time period (e.g., 4 hours or another time period). X% can be 75% or another percentage, and can be dynamically adjusted.

In the second phase 210, the machine learning-based workload management engine 104 determines (at 212) priorities and other factors (e.g., lengths of execution) of respective workloads. This determination can include accessing metadata associated with the workloads, where the metadata can include information indicating relative priorities and other factors of the corresponding workloads.

The machine learning-based workload management engine 104 then selects (at 214) workloads in the significant workload clusters identified in the first phase 202, where constraints on resource usage are to be applied on the selected workloads. The selected workloads are selected based on comparing the relative priorities and other factors of the workloads in the significant workload clusters, for example, where the selected workloads are those with lower priorities and/or run for longer periods of time.

Figure 3:
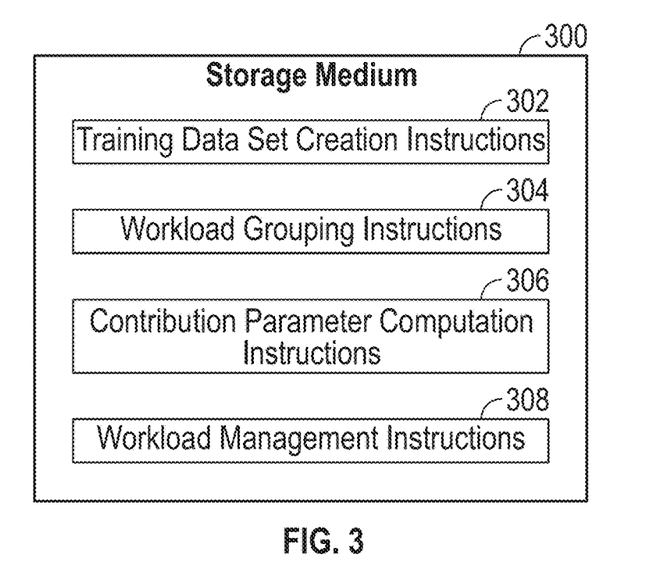
FIG. 3 is a block diagram of the storage medium storing machine-readable instructions, according to some examples.

FIG. 3 is a block diagram of a non-transitory machine-readable or computer-readable storage medium 300 storing machine-readable instructions that upon execution cause a system (e.g., the workload management engine 104, the storage system 102, etc.) to perform various tasks.

The machine-readable instructions include training data set creation instructions 302 to create a training data set (e.g., 122 in FIG. 1) based on features of sample workloads. The training data set includes labels associated with the features of the sample workloads, where the labels are based on load indicators (e.g., L_t in Eq. 1) that are generated in a computing environment (e.g., the storage system 102) relating to load conditions of the computing environment resulting from execution of the sample workloads. The sample workloads can be represented by workload clusters, for example.

The machine-readable instructions include workload grouping instructions 304 (such as those of the workload clustering logic 114 of FIG. 1) to group selected workloads into a plurality of workload clusters based on features of the workloads. The "selected" workloads are those workloads that are to be subject to the machine-learning based workload management, which may or may not include one or more of the sample workloads.

In some examples, each workload of the workloads is performed on a respective storage volume in the computing environment. In some examples, a workload cluster includes workloads having similar I/O patterns with respect to I/O accesses of a number of storage volumes.

In some examples, the features used to perform workload clustering include measures relating to access of resources in the computing environment, such as write throughput measurements.

The machine-readable instructions include parameter computation instructions 306 (such as those of the workload cluster contribution parameter computation logic 116 of FIG. 1) to compute, using a model (e.g., 120 in FIG. 1) trained based on the training data set, parameters (such as those of Eq. 1) representing contributions of respective workload clusters to a load condition in a computing environment (e.g., the storage system 102 or another computing environment). Note that the grouping of the selected workloads into the plurality of workload clusters reduces a quantity of features processed in the computing of the parameters using the model.

In some examples, the computation of the parameters representing the contributions of the respective workload clusters to the load is triggered in response to the load condition satisfying a criterion. For example, the load condition satisfies the criterion when greater than a specified quantity of the time intervals (e.g., the 5-minute intervals discussed further above) exhibit an excessive load condition (e.g., a delayed acknowledgement was issued in each of the specified quantity of the time intervals).

In some examples, the model is a linear regression model that is expressed as a function based on the parameters and measures relating to resource access in the computing environment (e.g., Eq. 1).

The machine-readable instructions include workload management instructions 308 to perform workload management in the computing environment based on the computed parameters.

In some examples, the performing of the workload management in the computing environment based on the computed parameters includes identifying a workload that belongs to a workload cluster of the plurality of workload clusters indicated by a parameter of the parameters as contributing to an overload condition in the computing environment, and restricting a resource usage by the identified workload.

In some examples, the performing of the workload management in the computing environment based on the computed parameters includes determining a relative priority of the identified workload to other workloads, where the restricting of the resource usage is in response to the determined relative priority.

Figure 4:
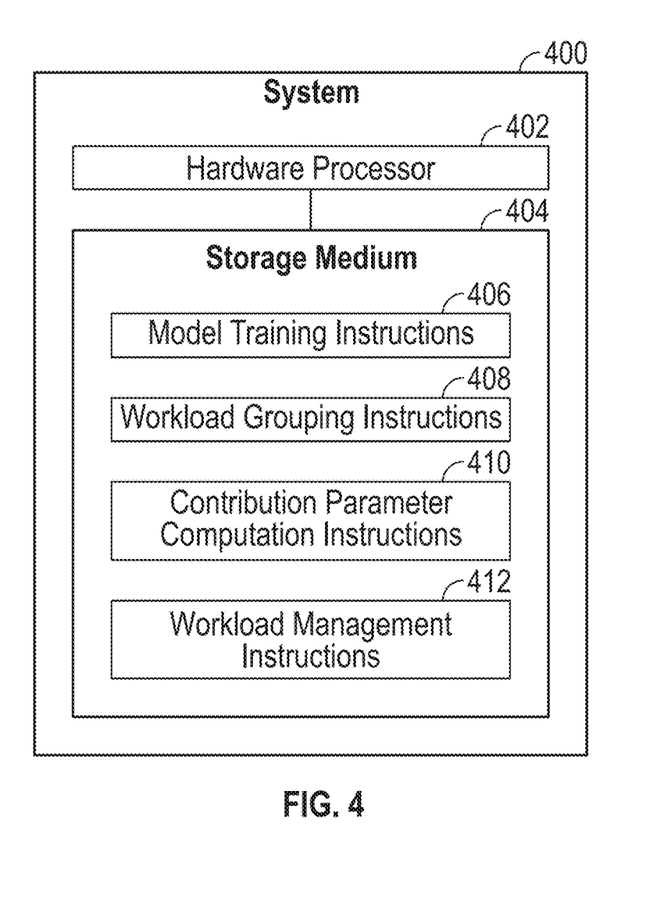
FIG. 4 is a block diagram of a system according to some examples.

FIG. 4 is a block diagram of a system 400 (e.g., the workload management engine 104, the storage system 102, or another computer or arrangement of computers). The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include model training instructions 406 to train a model using a training data set (e.g., the training data set 122 of FIG. 1) including information of past workloads performed in a storage environment (e.g., the storage system 102). The training data set includes labels associated with features of the past workloads, where the labels are based on load indicators generated in the storage environment relating to load conditions of the storage environment resulting from execution of the past workloads.

The machine-readable instructions in the storage medium 304 include workload grouping instructions 408 to group current workloads into a plurality of workload clusters based on features of the current workloads. The features include measures relating to storage resource access in the storage environment.

In some examples, each current workload includes storage resource access activities performed with respect to a respective storage volume in the storage environment.

The machine-readable instructions in the storage medium 304 include contribution parameter computation instructions 410 to compute, using the trained model, parameters representing contributions of respective workload clusters of the plurality of workload clusters to an overload condition in the storage environment.

The machine-readable instructions in the storage medium 404 include workload management instructions 412 to perform workload management in the storage environment based on the computed parameters.

Figure 5:
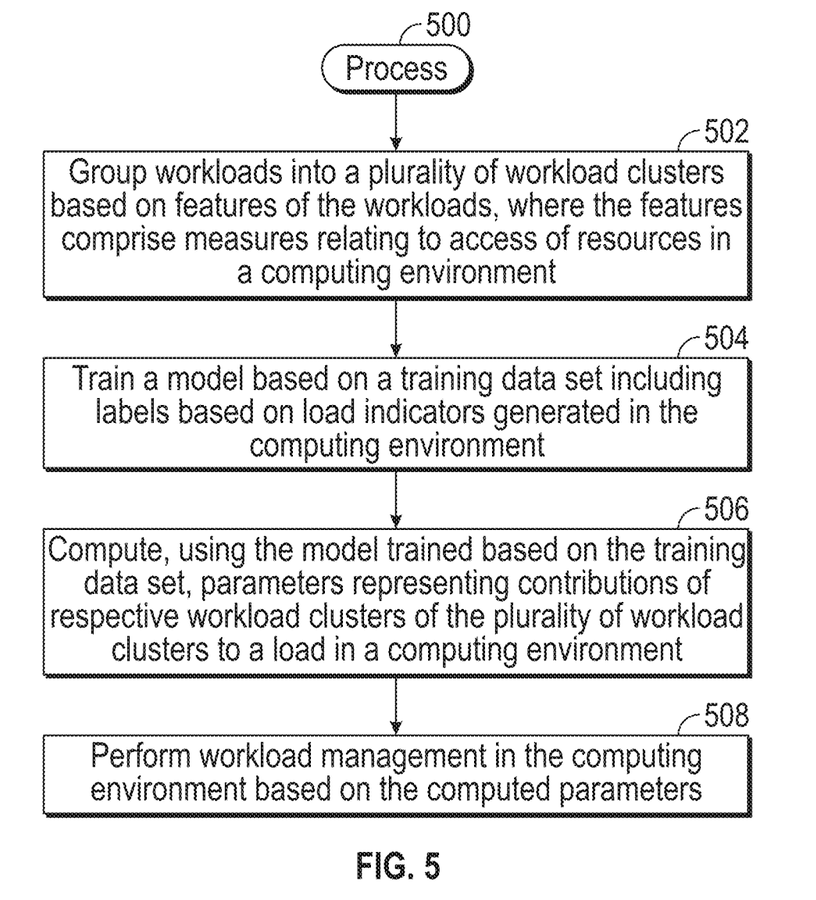
FIG. 5 is a flow diagram of a process according to some examples.

FIG. 5 is a flow diagram of a process 500 according to some examples. The process 500 can be performed by a system including a hardware processor.

The process 500 includes grouping (at 502) workloads into a plurality of workload clusters based on features of the workloads, where the features comprise measures relating to access of resources in a computing environment.

The process 500 includes training (at 504) a model based on a training data set, the training data set including labels associated with features of sample workloads, where the labels are based on load indicators generated in the computing environment relating to load conditions of the computing environment resulting from execution of the sample workloads.

The process 500 includes computing (at 506), using the model trained based on the training data set, parameters representing contributions of respective workload clusters of the plurality of workload clusters to a load in a computing environment. The grouping of the workloads into the plurality of workload clusters reduces a quantity of features processed in the computing of the parameters using the model.

The process 500 includes performing (at 508) workload management in the computing environment based on the computed parameters.

The process 500 can update the training data set during an operation of the computing environment, and re-train the model using the updated training data set.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   create a training data set based on features of sample workloads, the training data set comprising labels associated with the features of the sample workloads, wherein the labels are based on load indicators generated in a computing environment relating to load conditions of the computing environment resulting from execution of the sample workloads;
   group selected workloads into a plurality of workload clusters based on features of the selected workloads, wherein a workload cluster of the plurality of workload clusters comprises workloads grouped into the workload cluster according to a similarity criterion;
   compute, using a model trained based on the training data set, parameters representing contributions of respective workload clusters of the plurality of workload clusters to a load condition in the computing environment, wherein the parameters comprise a first parameter representing a contribution of a first workload cluster to the load condition, and a second parameter representing a different contribution of a second workload cluster to the load condition, the first and second workload clusters being part of the plurality of workload clusters;
   select a workload cluster of the plurality of workload clusters based on different values of the computed parameters; and
   perform workload management in the computing environment based on the computed parameters, the workload management comprising restricting usage of a resource by a workload in the selected workload cluster.

2. The non-transitory machine-readable storage medium of claim 1, wherein each workload of the selected workloads is performed on a respective storage volume in the computing environment.

3. The non-transitory machine-readable storage medium of claim 2, wherein a workload cluster of the plurality of workload clusters includes workloads having similar input/output patterns.

4. The non-transitory machine-readable storage medium of claim 1, wherein the features of the selected workloads comprise measures relating to access of resources in the computing environment.

5. The non-transitory machine-readable storage medium of claim 4, wherein the measures relating to access of resources comprise measures relating to throughputs in writing to storage resources.

6. The non-transitory machine-readable storage medium of claim 1, wherein the value of the parameter computed for the selected workload cluster indicates that the selected workload cluster has the workload that adversely affects a performance of a workload in another workload cluster of the plurality of workload clusters.

7. The non-transitory machine-readable storage medium of claim 1, wherein the instructions upon execution cause the system to:
   trigger the computation of the parameters representing the contributions of the respective workload clusters to the load condition in response to the load condition satisfying a criterion.

8. The non-transitory machine-readable storage medium of claim 7, wherein the features of the selected workloads comprise measures relating to access of resources of the computing environment in corresponding time intervals, and wherein the load condition satisfies the criterion when greater than a specified quantity of the time intervals exhibit an excessive load condition.

9. The non-transitory machine-readable storage medium of claim 8, wherein the excessive load condition is present in a given time interval of the time intervals when an acknowledgment of a completion of an access of a resource is delayed.

10. The non-transitory machine-readable storage medium of claim 1, wherein the different values of the computed parameters represent respective different contributions of the respective workload clusters to the load condition.

11. The non-transitory machine-readable storage medium of claim 1, wherein the instructions upon execution cause the system to:
   select the workload cluster of the plurality of workload clusters based on identifying a workload cluster that has a higher contribution to the load condition than another workload cluster of the plurality of workload clusters.

12. The non-transitory machine-readable storage medium of claim 1, wherein the resource is a shared resource shared by multiple workload clusters, and the restricting comprises a restriction on usage of the shared resource by the workload in the selected workload cluster.

13. The non-transitory machine-readable storage medium of claim 12, wherein the different values comprise a first value of the first parameter computed for the first workload cluster, and a different second value of the second parameter computed for the second workload cluster, and wherein the first value and the second value indicate that the first workload cluster has a higher contribution to the load condition by consuming more of the shared resource than the second workload cluster.

14. The non-transitory machine-readable storage medium of claim 1, wherein the model is a linear regression model comprising a plurality of coefficients representing the computed parameters.

15. A system comprising:
a processor; and
a non-transitory machine-readable storage medium comprising instructions executable on the processor to:
train a model using a training data set comprising information of past workloads performed in a storage environment, the training data set comprising labels associated with features of the past workloads, wherein the labels are based on load indicators generated in the storage environment relating to load conditions of the storage environment resulting from execution of the past workloads;
group current workloads into a plurality of workload clusters based on features of the current workloads, the features of the current workloads comprising measures relating to storage resource access in the storage environment, wherein a workload cluster of the plurality of workload clusters comprises workloads grouped into the workload cluster according to a similarity criterion;
compute, using the trained model, parameters representing contributions of respective workload clusters of the plurality of workload clusters to an overload condition in the storage environment, wherein the parameters comprise a first parameter representing a contribution of a first workload cluster to the overload condition, and a second parameter representing a different contribution of a second workload cluster to the overload condition, the first and second workload clusters being part of the plurality of workload clusters;
select a workload cluster of the plurality of workload clusters based on different values of the computed parameters; and
perform workload management in the storage environment based on the computed parameters, the workload management comprising restricting usage of a storage resource by a workload in the selected workload cluster.

16. The system of claim 15, wherein the value of the parameter computed for the selected workload cluster indicates that the selected workload cluster has the workload that adversely affects a performance of a workload in another workload cluster of the plurality of workload clusters.

17. The system of claim 15, wherein the instructions are executable on the processor to:
select the workload cluster of the plurality of workload clusters based on identifying a workload cluster that has a higher contribution to the overload condition than another workload cluster of the plurality of workload clusters.

18. The system of claim 15, wherein the features of the selected workloads comprise measures relating to access of resources of the storage environment in corresponding time intervals, and wherein the instructions are executable on the processor to:
trigger the computation of the parameters representing the contributions of the respective workload clusters to the overload condition in response to the overload condition satisfying a criterion based on greater than a specified quantity of the time intervals exhibiting an excessive load condition, wherein the excessive load condition is present in a given time interval of the time intervals when an acknowledgment of a completion of an access of a storage resource is delayed.

19. A method of a system comprising a hardware processor, comprising:
grouping workloads into a plurality of workload clusters based on features of the workloads, wherein the features comprise measures relating to access of resources in a computing environment, and wherein a workload cluster of the plurality of workload clusters comprises workloads grouped into the workload cluster according to a similarity criterion;
training a model based on a training data set, the training data set comprising labels associated with features of sample workloads, wherein the labels are based on load indicators generated in the computing environment relating to load conditions of the computing environment resulting from execution of the sample workloads;
computing, using the model trained based on the training data set, parameters representing contributions of respective workload clusters of the plurality of workload clusters to a load in the computing environment, wherein the grouping of the workloads into the plurality of workload clusters reduces a quantity of features processed in the computing of the parameters using the model, and wherein the parameters comprise a first parameter representing a contribution of a first workload cluster to the load, and a second parameter representing a different contribution of a second workload cluster to the load, the first and second workload clusters being part of the plurality of workload clusters;
selecting a workload cluster of the plurality of workload clusters based on different values of the computed parameters; and
performing workload management in the computing environment based on the computed parameters, the workload management comprising restricting usage of a resource by a workload in the selected workload cluster.

20. The method of claim 19, further comprising:
updating the training data set during an operation of the computing environment; and
re-training the model using the updated training data set.

* * * * *